No. 865,039. PATENTED SEPT. 3, 1907.
F. M., J. S. & W. W. HILTON.
MEANS FOR SECURING SOFT TREAD TIRES TO RIMS.
APPLICATION FILED MAY 11, 1906.
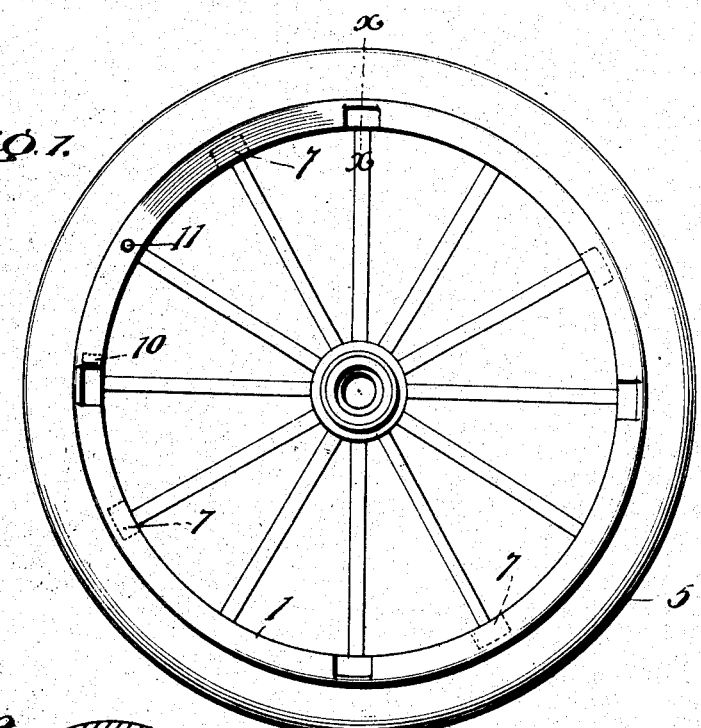
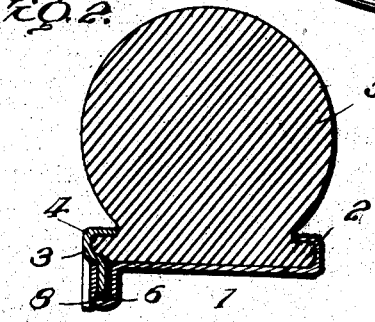
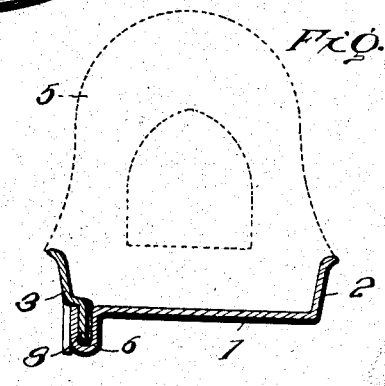
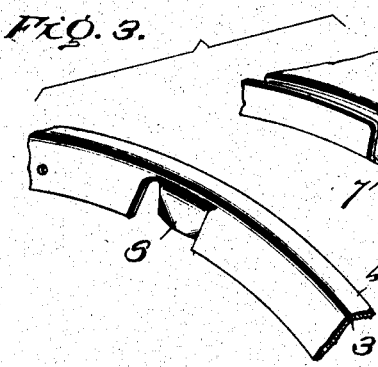
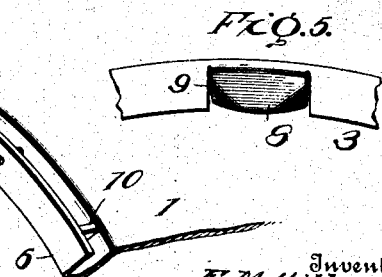

UNITED STATES PATENT OFFICE.

FRANK M. HILTON, JOHN S. HILTON, AND WILLIAM W. HILTON, OF AKRON, OHIO, ASSIGNORS OF ONE-HALF TO HARVEY MUSSER, OF AKRON, OHIO.

MEANS FOR SECURING SOFT-TREAD TIRES TO RIMS.

No. 865,039.

Specification of Letters Patent.

Patented Sept. 3, 1907.

Application filed May 11, 1906. Serial No. 316,403.

*To all whom it may concern:*

Be it known that we, FRANK M. HILTON, JOHN S. HILTON, and WILLIAM W. HILTON, citizens of the United States, residing at Akron, in the county of Summit and State of Ohio, have invented certain new and useful Improvements in Means for Securing Soft-Tread Tires to Rims, of which the following is a specification.

This invention has relation to vehicle wheels and more particularly to the type of wheels provided with a yielding tire, either of the pneumatic cushion or solid type, the purpose being to admit of the tire being easily and conveniently placed in position and readily removed for any purpose, stretching not being required and the annoyance of drawing together binders of different kinds being obviated.

In accordance with this invention the rim of the wheel is provided at one side with a fixed flange and at the opposite side with a lock-ring, which is continuous and made fast when the parts are assembled by interlocking means which constitute the essential feature of the present invention.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a vehicle wheel having its tire secured by means embodying the invention. Fig. 2 is a cross section on the line x—x of Fig. 1, showing the parts on a larger scale. Fig. 3 is a detail perspective view of a portion of the rim and a portion of the lock-ring, the parts being separate. Fig. 4 is a view similar to Fig. 2 of a modification. Fig. 5 is a detail view of a portion of the lock-ring.

Corresponding and like parts are referred to in the following description and indicated in all the views of the drawings by the same reference characters.

The invention may be adapted to any construction of wheel or type of soft or yieldable tire. The wheel illustrated is of the variety commonly used upon mechanically driven machines, such as automobiles and vehicles of kindred type. The rim 1 of the wheel is provided at one side with a retaining flange 2, which is preferably an integral part thereof, said flange conforming to the special type or design of tire and varying according to the style of wheel to which the invention is adapted. A lock-ring 3 is fitted to the opposite side of the rim and its flange 4 corresponds to the flange 2 and depends for its outline upon the special form of tire 5 for which the invention is adapted. Interlocking means secure the lock-ring when properly placed in position.

An annular groove or channel 6 is provided at the side of the rim 1 and adapted to receive the lock-ring 3, and the outer wall of said annular groove or channel is provided at intervals with notches 7 to admit of the ingress and egress of lugs 8 of the lock-ring. The lugs 8 correspond in position and number with the notches 7 and are an integral part of the lock-ring and are preferably formed by pressing portions of the lock-ring inward after being separated by slits 9 extended outward from the inner edge of the lock-ring. The end portions of the lugs 8 have their inner corners bent to facilitate their riding under the inner wall of the lock-ring when turning the latter either to the right or to the left to throw the lugs out of register with the notches 7 and cause them to engage beneath the outer wall bordering upon the annular groove or channel 6. Any means may be provided to limit the turning of the lock-ring, such as a stop 10, against which one of the lugs 8 engages. To prevent casual turning of the lock-ring, after the parts have been properly positioned, suitable securing means may be employed, such for instance as a pin or screw 11. Portions of the lock-ring between the lugs 8 are adapted to bear against the outer side of the wall bordering upon the groove or channel 6, whereas the lugs 8 bear against the inner side of said wall, the latter being confined between the lugs 8 and the parts of the lock-ring between said lugs.

As stated, the tire 5 may be of any variety, such as solid cushion or pneumatic, and may be of any cross-sectional outline according to the make.

In adapting the invention to the particular make of tire, the confining flanges at opposite sides of the rim 1 may be inturned, as shown most clearly in Fig. 2, or flared, as indicated more particularly in Fig. 4. When the lock-ring 3 is removed from the rim, the tire 5 may be either placed in position or removed, and when placed upon the rim is secured by the lock-ring which is slipped upon the grooved or channeled side of the rim, the lugs 8 being brought into position to register with the notches 7, and after said lugs have passed through the notches, the lock-ring is given a partial turn either to the right or to the left, with the result that the lugs 8 are caused to engage with the inner side of the outer wall bordering upon the groove or channel 6. After the lock-ring has been turned to the required position it is made fast by the pin or screw 11.

Having thus described the invention, what is claimed as new is:

1. A vehicle wheel provided with a rim having a confining flange at one side and a groove, or channel, at the opposite side, the outer wall of the groove, or channel, having notches at intervals, a tire slipped upon the rim and a lock-ring fitted to the grooved side of said rim and having a confining flange coöperating with the confining flange of the rim to prevent lateral displacement of the tire, said lock-ring having transversely spaced portions to embrace opposite sides of the outer wall of the grooved portion of the rim, the inner spaced portions consisting of lugs adapted to pass through the notches formed in the outer walls of the grooved portion of the rim and to engage the inner, or rear side thereof.

2. A vehicle wheel provided with a rim having a confining flange at one side and a groove, or channel, at the opposite side, the outer wall of the grooved portion having notches at intervals in its length, a stop located in the groove, or channel, and connecting opposite walls thereof, a tire slipped upon the rim and a lock-ring comprising a confining flange, and a rim engaging flange, the latter having portions pressed therefrom to form lugs to pass through the notches in the outer wall of the grooved portion of the rim and engage the inner side thereof, one of said lugs adapted to make contact with the said stop to limit the movement of the lock-ring in one direction.

3. In a vehicle wheel, the combination of a rim having a confining flange at one side, and a wall at the opposite side having notches therein at intervals, a tire slipped upon the rim, a lock-ring having a confining flange and provided at intervals with lugs to correspond with the notches of said wall, said lugs having opposite corners beveled to facilitate their entrance and riding under the said wall when turning the ring in one direction or the other to cause the lugs to pass in the rear of said wall after having been passed through the notches thereof.

4. In a vehicle wheel, the combination of a rim provided at one side with a confining flange and having a channel or groove at the opposite side, the outer wall of said groove or channel being provided at intervals with notches, and a lock-ring having a companion confining flange and provided at intervals with lugs pressed therefrom and adapted to pass through the notches of said wall and to engage with the rear side thereof upon turning the lock-ring in one direction or the other.

In testimony whereof we affix our signature in presence of two witnesses.

FRANK M. HILTON. [L. S.]
JOHN S. HILTON. [L. S.]
WILLIAM W. HILTON. [L. S.]

Witnesses:
EDITH E. MERRELL,
LOTTIE M. RUSSELL.